(12) United States Patent
Gassner

(10) Patent No.: US 11,307,556 B2
(45) Date of Patent: Apr. 19, 2022

(54) CONTROL SYSTEM AND METHOD FOR CONTROLLING CINEMA SEATS

(71) Applicant: LIMOSS (DONGGUAN) CO., LTD., Guangdong (CN)

(72) Inventor: Christian Gassner, Dongguan (CN)

(73) Assignee: LIMOSS (DONGGUAN) CO., LTD., Dongguan (CN)

(*) Notice: Subject to any disclaimer, the term of this patent is extended or adjusted under 35 U.S.C. 154(b) by 366 days.

(21) Appl. No.: 16/404,541

(22) Filed: May 6, 2019

(65) Prior Publication Data
US 2019/0258218 A1  Aug. 22, 2019

Related U.S. Application Data

(63) Continuation-in-part of application No. PCT/CN2016/105265, filed on Nov. 10, 2016.

(51) Int. Cl.
*G05B 19/402* (2006.01)
*A47C 1/12* (2006.01)
(Continued)

(52) U.S. Cl.
CPC .............. *G05B 19/402* (2013.01); *A47C 1/12* (2013.01); *A47C 7/72* (2013.01); *A63J 25/00* (2013.01);
(Continued)

(58) Field of Classification Search
CPC .............. G05B 19/402; G05B 19/418; G05B 2219/40175; A47C 7/72; A47C 1/12; A63J 25/00
See application file for complete search history.

(56) References Cited

U.S. PATENT DOCUMENTS

| 4,294,048 A | 10/1981 | Sutter |
| 2012/0203378 A1 | 8/2012 | Yank, III |
| 2017/0221350 A1* | 8/2017 | Hille ............... G08C 17/00 |

FOREIGN PATENT DOCUMENTS

| CN | 103279080 A | 9/2013 |
| CN | 203689130 U | 7/2014 |

(Continued)

OTHER PUBLICATIONS

PCT International Search Report; Application No. PCT/CN2016/105265; dated Aug. 2, 2017; 8 pages.
(Continued)

*Primary Examiner* — Milton Nelson, Jr.
(74) *Attorney, Agent, or Firm* — Conley Rose, P. C.; Grant Rodolph

(57) ABSTRACT

A control system for cinema seats and a method for controlling cinema seats, including: a plurality of seats; and an actuation device, configured for driving each of the seats to be folded or unfolded. The control system for cinema seats further includes: a control signal transmitter; control signal receivers, configured to be arranged corresponding to one or more of the seats; the control signal transmitter is configured to communicatively connect with each of the control signal receivers, the control signal receiver is electrically connected to one or more of the actuation devices, and each of the control signal receivers can retain a used record of the actuation device, and each of the control signal receivers receives a control signal from the control signal transmitter to control one or more of the actuation devices to drive one or more of the seats to be folded or unfolded.

19 Claims, 2 Drawing Sheets

(51) Int. Cl.
*A63J 25/00* (2009.01)
*A47C 7/72* (2006.01)
*G05B 19/418* (2006.01)

(52) U.S. Cl.
CPC .. *G05B 19/418* (2013.01); *G05B 2219/40175* (2013.01)

(56) References Cited

FOREIGN PATENT DOCUMENTS

| | | |
|---|---|---|
| CN | 203689131 U | 7/2014 |
| CN | 205263632 U | 5/2016 |
| CN | 106101243 A | 11/2016 |
| JP | 11318623 A * | 11/1999 |
| WO | 2008132690 A2 | 11/2008 |
| WO | 2016164281 A1 | 10/2016 |

OTHER PUBLICATIONS

PCT Written Opinion of the International Searching Authority; Application No. PCT/CN2016/105265; dated Aug. 2, 2017; 6 pages.

\* cited by examiner

S10 — pairing the control signal transmitter with the control signal receiver in the control system for cinema seats S20 — selecting a corresponding control mode and using the control signal transmitter to send a control signal to each of the control signal receivers to control one or more seats of the control system for cinema seats to be folded or unfolded after the pairing is completed S30 — adjusting the control signal transmitter from a signal transmission state to a standby state, ready to repeat the operation of the step S20 next time S40 — turning off the power of the control signal transmitter and/or the control signal receiver to end the operation of the control system for cinema seats

FIG. 2

CONTROL SYSTEM AND METHOD FOR CONTROLLING CINEMA SEATS

CROSS-REFERENCE TO RELATED APPLICATIONS

This application is a continuation in part of International Application No. PCT/CN2016/105265 filed Nov. 10, 2016 by Christian Gassner entitled, "Control System and Method for Controlling Cinema Seats", which is incorporated by reference herein as if reproduced in its entirety.

TECHNICAL FIELD

The present disclosure generally relates to the technical field of designing for a cinema device, and more specifically to a control system and a method for controlling cinema seats.

BACKGROUND TECHNOLOGY

At present, the seats in the cinema are arranged in rows, and in order to improve the utilization efficiency of the cinema space, the gap between the adjacent rows of seats is small. In order to conveniently allow the worker of the cinema to easily walk while cleaning the cinema, the seats of the cinema are generally designed to be foldable. That is, the seats are in a folded state when the cinema is idle, such that the worker of the cinema can walk easily back and forth. When the film audiences enter the cinema to watch the movie, the film audiences unfold the seat by themselves, and after the film audiences leave, the worker of the cinema will fold the seats. In the prior art, the management of the powered seats in the cinema completely relies on the worker of the cinema to check one by one, which leads to a problem that the management task of the worker of the cinema is heavy and the workload is large.

SUMMARY

An object of the present application is to provide a control system and a method for controlling cinema seats, in order to solve the problem that the management task of the worker of the cinema is heavy and the workload is large.

In order to solve the above problem the present application provides, a control system for cinema seats, including: a plurality of seats; and a plurality of actuation devices, configured for driving each of the seats to be folded or unfolded, the control system for cinema seats further comprises: a control signal transmitter; a plurality of control signal receivers, configured to be arranged corresponding to one or more of the seats; the control signal transmitter is configured to communicatively connect with each of the control signal receivers, the control signal receiver is configured to be electrically connected to one or more of the actuation devices, and each of the control signal receivers is configured to retain used records of the actuation device, and each of the control signal receivers is configured to receive a control signal from the control signal transmitter to control one or more of the actuation devices to drive one or more of the seats to be folded or unfolded.

Optionally, each of the control signal receivers receives the control signal from the control signal transmitter to control the actuation devices to drive all the seats to be folded or unfolded.

Optionally, each of the control signal receivers receives the control signal from the control signal transmitter to control the actuation devices to drive the seats of odd or even rows to be folded or unfolded.

Optionally, each of the control signal receivers receives the control signal from the control signal transmitter to control the actuation devices having a used record to drive corresponding seats to be folded or unfolded.

Optionally, the control system for cinema seats further comprises hand controllers disposed in one-to-one corresponding to each of the seats, the hand controller is configured to communicatively connect with corresponding actuation device to control the corresponding seats to be folded or unfolded.

Optionally, the control signal receiver is provided with a signal receiving module and a control module, and the signal receiving module is electrically connected to the control module, the control module is electrically connected to the actuation devices, the signal receiving module receives a control signal sent by the control signal transmitter and transmits to the control module, the control module controls the actuation device to drive the seats to be folded or unfolded.

Optionally, the hand controller is electrically connected to the control module, the control module is configured to distinguish a source of the control signal, and when the control module recognizes that the control signal is from the hand controller, the control signal transmitted by the signal receiving module to the control module is invalid.

Optionally, the control system for cinema seats further comprises a pressure detecting device, the pressure detecting device is mounted in the seat, and the pressure detecting device is electrically connected to the control module, when the pressure detecting device detects that the seat is under pressure, the control signal transmitted by the signal receiving module to the control module is invalid.

Optionally, the control system for cinema seats further comprises a clutch structure, the clutch structure is disposed between the actuation device and the seats, and the clutch structure is configured to connect the actuation device with the seat to achieve driving, or to disconnect the actuation device from the seat to achieve manual folding or unfolding of the seats.

According to another aspect of the present application, a method for controlling cinema seats, the method is configured to control the control system for cinema seats; the method including steps of:

S10 includes pairing the control signal transmitter with the control signal receivers in the control system for cinema seats;

S20 includes selecting a corresponding control mode and using the control signal transmitter to send a control signal to each of the control signal receivers to control one or more seats of the control system for cinema seats to be folded or unfolded after the pairing is completed;

S30 includes adjusting the control signal transmitter from a signal transmission state to a standby state, ready to repeat the operation of the step S20 next time; and S40 includes turning off the power of the control signal transmitter and/or the control signal receiver to end the operation of the control system for cinema seats.

Optionally, the control signal transmitter is pre-set with a protection mode, and when a conversion frequency of the signal sent by the control signal transmitter is greater than or equal to a predetermined frequency, the control signal transmitter fails for a predetermined period of time.

Optionally, in the step S20, the control mode is to transmit a control signal to each of the control signal receivers by using the control signal transmitter to control all the seats of the cinema seat system to be folded or unfolded.

Optionally, in the step S20, the control mode is to transmit a control signal to each of the control signal receivers by using the control signal transmitter to control the seats of the odd rows of the cinema seat system to be folded or unfolded.

Optionally, in the step S20, the control mode is to transmit a control signal to each of the control signal receivers by using the control signal transmitter to control the seats of the even rows of the cinema seat system to be folded or unfolded.

Optionally, in the step S20, the control mode is to transmit a control signal to each of the control signal receivers by using the control signal transmitter to control the seats having the used record of the cinema seat system to be folded or unfolded.

In the present application, the worker of the cinema only need to operationally control the control signal transmitter, thereby controlling one or more powered seats to be folded together, or one or more power seats to be unfolded together. Thus, the simple and fast processing is achieved and the workload of the worker of the cinema is reduced.

BRIEF DESCRIPTION OF THE DRAWINGS

FIG. 2 is a flow chart of operational steps of an embodiment of a method for controlling cinema seats of the present application.

DETAILED DESCRIPTION

Figure 1:
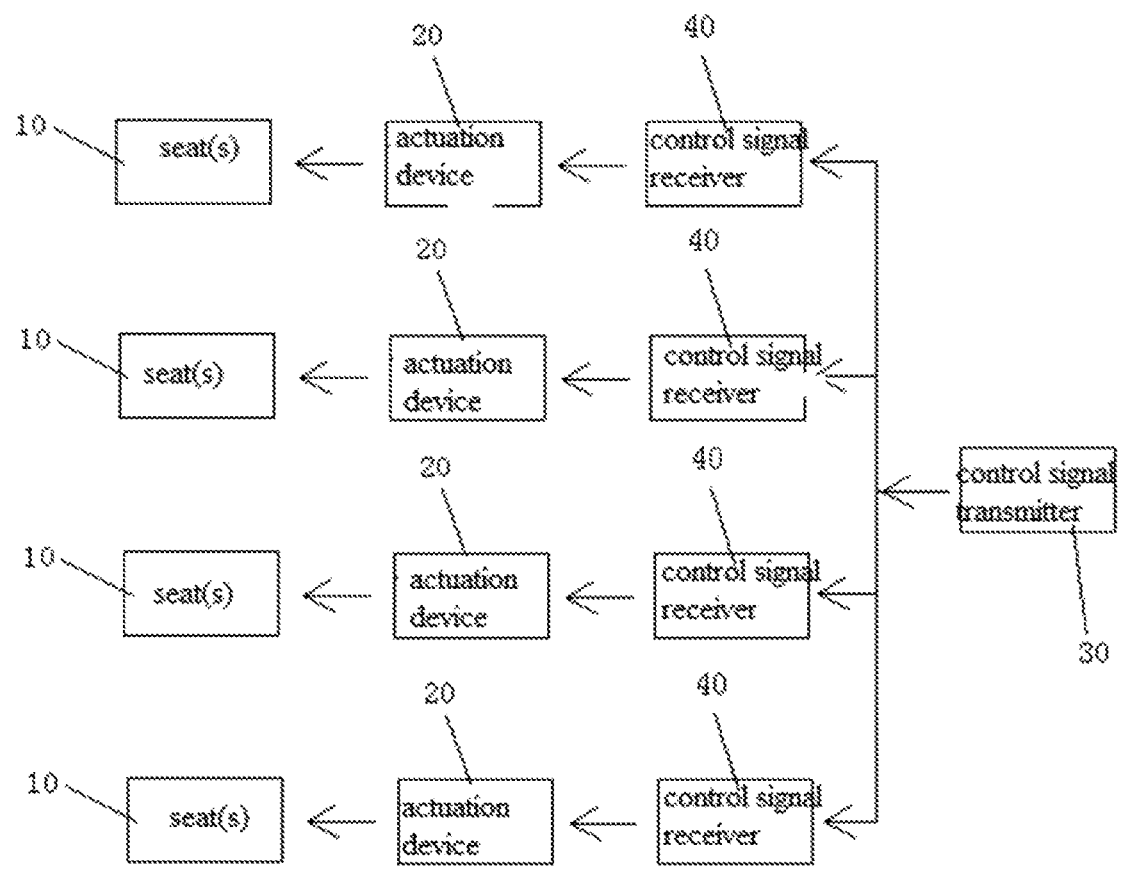
FIG. 1 is a structure block diagram of an embodiment of a control system for cinema seats of the present application.

In order to make the purpose, the technical solution, and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

It should be noted that, positional terms in the following embodiments, such as "left", "right", "up", "down", "top", "bottom", and so on, are merely mutually relative concepts or take a normal use state of a product as a reference, and shouldn't be considered as being restrictive.

As shown in FIG. 1, in the present embodiment, the provided control system for cinema seats includes a plurality of seats 10 and a plurality of actuation devices 20 configured for driving each of the seats 10 to be folded or unfolded. The control system for cinema seats further includes a control signal transmitter 30 and a plurality of control signal receivers 40 configured to be arranged corresponding to one or more of the seats 10, and the control signal transmitter 30 is configured to communicatively connect with each of the control signal receivers 40 (i.e., in the present embodiment, the control signal transmitter 30 is configured to communicatively connect with each of the control signal receivers 40 by a wireless signal). The control signal receiver 40 is electrically connected to one or more of the actuation devices 20, and each control signal receiver 40 can retain a used record of the actuation device 20. Further, each of the control signal receivers 40 receives a control signal from the control signal transmitter 30 to control one or more of the actuation devices 20 to drive the corresponding seat 10 to be folded or unfolded. In the present embodiment, the seats 10 and the actuation devices 20 are arranged in one-to-one correspondence, but the control signal receivers 40 and the actuation devices 20 can be arranged in one-to-many or one-to-one correspondence. In the embodiment, the seats 10 to be folded or unfolded refer to the footrest portion of the seats. In addition, this remote centralized control can also be applied to other parts of the seats requested by the customer.

In the present embodiment, each of the control signal receivers 40 can be electrically connected to a single actuation device 20 to individually control the folding and unfolding of one of the seats 10. Alternatively, each of the control signal receivers 40 can be electrically connected to two, three, or more actuation devices 20 at the same time, thereby controlling the folding and unfolding of one or more seats 10. Herein, there may only be one of the two, three, or more actuation devices 20 being driven, or all of the actuation devices 20 are driven, specifically, based on the used records of the actuation devices 20 retained by the respective control signal receivers 40. Herein, the used records of the actuation devices 20 refers to the original state relative to the seats 10, which have a record that is driven to be folded or unfolded.

The worker of the cinema transmits a control signal for unfolding or folding the seats 10 to the control signal receivers 40 by operating the control signal transmitter 30, and then the control signal receivers 40 control the actuation devices 20 to do action, thereby each of the actuation devices 20 respectively drives the seats 10 that are folded or unfolded. Thus, when the film audiences enter the cinema to watch the movie, the film audiences find their own positions according to ticket information, and then watch the movie by unfolding the seat 10. In another embodiment, since most of the cinemas have the problem that some seats thereof may not be used, the state of the used seats are unknown when the film audiences have left, because the seats that may not be used are always in the folded state. At this time, the worker of the cinema only needs to perform operation control to the control signal transmitter 30, thereby controlling all the seats 10 that have been unfolded to be folded together (or all the folded seats are unfolded together), so that all the seats in the cinema are in a folded state, which makes it easy and quick to handle.

In one embodiment of the control system for cinema seats, the worker installs a pre-written program into the control signal transmitter 30, and then the control signal is transmitted. The control signal receivers 40 receive the signal and control the actuation devices 20 in time to unfold or fold all the seats together.

In another embodiment of the control system for cinema seats, the worker installs the pre-written program into the control signal transmitter 30, and then the control signal is transmitted. The control signal receivers 40 receive the signal and control the actuation devices 20 in time to unfold or fold all the seats in odd or even rows. This makes it possible to control the unfolding or folding of the seat row by row, thereby facilitating effective and rapid control of the control system and saving energy when the area in which the seats are used is dense.

In another embodiment of the control system for cinema seats, the worker installs the pre-written program into the control signal transmitter 30, and then transmits the control signal. The control signal receivers 40 receive the signal and control the drive in time to unfold or fold all the seats that have been used. This control method can be used to facilitate the control system to more accurately and effectively control the corresponding seats to be unfolded or folded when the number of the film audiences is less and the used area of the seating is dispersed. Thereby, unnecessary mechanical movement can be reduced, service life of the products can be improved, and the energy consumption can be reduced.

The foregoing control schemes may exist separately or simultaneously. In this embodiment, it is preferable that the foregoing multiple control schemes exist simultaneously; thereby, one, more, or all seats are quickly and effectively controlled to be unfolded or folded according to the different situations. Therefore, meeting the need for rapidly controlling the folding and unfolding of one or more seats, while reducing unnecessary mechanical movements to increase product life and reduce energy consumption.

When the film audiences enter the cinema, the film audience finds the corresponding seat 10 and unfolds the seat 10 for viewing. In order to enable the film audience to adjust the seat 10 accurately, the cinema seat control system further includes a plurality of hand controllers disposed in one-to-one correspondence with each of the seats 10, the hand controller is in communication connected with the corresponding actuation device 20 to control the corresponding seat 10 to be unfolded or folded (the hand controller can be in wireless communication connected with the actuation device 20, or the hand controller can be in wired communication connected with the actuation device 20). Thus, the film audiences can use the hand controller to manually control the seat to be unfolded when the seat needs to be adjusted, which makes the seats to be unfolded or folded more convenient. In addition, the hand controller not only provides a footrest for the film audience to fold or unfold from the seat, but may also be arranged to control other parts of the seat that need to be adjusted according to the needs of the customer, such as a seat cushion portion, a chair back portion, a head portion, etc.

The control signal receiver 40 is provided with a signal receiving module and a control module. The signal receiving module is electrically connected to the control module. The control module is electrically connected to the actuation device 20. The signal receiving module receives the control signal sent by the control signal transmitter 30 and transmits the control signal to the control module. The control module controls the actuation device 20 to drive the seat 10 to be unfolded or folded The hand controller is electrically connected to the control module, the control module is configured to distinguish a source of the control signal, and the control signal transmitted from the signal receiving module to the control module is invalid when the control module recognizes a control signal from the hand controller, that is, the control signal is transmitted by the control signal transmitter 30 to realize the control performance when the seat 10 is adjusted by the hand controller. Thus, the control performance is invalid and the transmitted control signal cannot control the seat 10.

In order to protect the seat 10, when the film audience sits on the seat 10 or the seat 10 is placed with a film audience's item, and also to protect the film audience's item, at this time, the cinema seat control system further includes a pressure detecting device installed at the seat 10. The pressure detecting device detects the gravity received by the seat 10 and the pressure detecting device is electrically connected to the control module. The control module distinguishes whether there is a person sitting on the seat 10 or if something else exists. According to the pressure result detected by the pressure detecting device, when the pressure detecting device detects that the seat 10 is under pressure, the control signal transmitted by the signal receiving module to the control module is invalid. At this time, even if the worker of the cinema adjusts the seat 10 by remotely transmitting the control signal, the seats 10 cannot be controlled to do action.

In this embodiment, the cinema seat control system further includes a clutch structure, the clutch structure is disposed between the actuation devices 20 and the seats 10. The clutch structure is configured for connecting the actuation devices 20 and the seats 10 to achieve driving, when the actuation devices 20 are connected with the seats 10 via the clutch structure, the seats 10 can be normally driven by the actuation devices 20. Alternatively, the clutch structure is configured for turning off the actuation devices 20 and the seats 10 to achieve folding or unfolding of the seats 10 manually. At this time, in the cinema seat control system, if the seats 10 are unable to be adjusted by the method of transmitting the control signal and the method of using the hand controller, it can be confirmed that the control signal transmitter 30 or the control signal receivers 40 have failed and the hand controller has failed at the same time.

According to another aspect of the present application, which provides a method for controlling the cinema seat. As shown in FIG. 2, the method for controlling the cinema seat is used to control the aforementioned control system for cinema seats, and includes the following steps:

Step S10: pairing the control signal transmitter 30 with the control signal receiver 40 in the control system for cinema seats. On the control signal transmitter 30, the worker of the cinema performs the pairing operation and the control operation through the control button provided on the control signal transmitter 30. During the process of the pairing, the control button on the control signal transmitter 30 is turned to the open gear position within 3 seconds (i.e., the gear position for sending a command of unfolding the seats 10), then the control button is turned to the closed position (the gear position for sending a command of folding the seat 10). Further, when the control button is turned to the open gear position, if the light emitting diode (LED) indicating the pairing mode is illuminated this represents the control signal transmitter 30 and the plurality of control signal receivers 40 are in the pairing mode, and when the control button is rotated to any other gear position, the control signal transmitter 30 and the control signal receivers 40 will exit the pairing mode and be in the normal operating mode.

Step S20: selecting a corresponding control mode and using the control signal transmitter 30 to send a control signal to each of the control signal receivers 40 to control one or more seats 10 of the control system for cinema seats to be folded or unfolded after the pairing is completed.

In the step S20, the control mode may be a first control mode using the control signal transmitter 30 to send a control signal to each of the control signal receivers 40 to control all of the seats 10 of the control system for cinema seats to be folded or unfolded.

In the first control mode, the control signal transmitter 30 sends a control signal of folding or unfolding, all of the control signal receivers 40 send control signals to control all of the actuation devices 20 such that all of the seats 10 are folded or unfolded.

In the step S20, the control mode may be a second control mode using the control signal transmitter 30 to send a control signal to each of the control signal receivers 40 to control the seats 10 of the odd rows of the control system for cinema seats to be folded or unfolded.

In the second control mode, the control signal transmitter 30 sends a control signal of folding or unfolding, and the control signal receivers 40 marked as odd rows send control signals to control the corresponding actuation devices 20, such that the seats 10 of the odd rows of the control system for cinema seats are folded or unfolded.

In the step S20, the control mode may be a third control mode using the control signal transmitter 30 to send a control signal to each of the control signal receivers 40 to control the seats 10 of the even rows of the control system for cinema seats to be folded or unfolded.

In the third control mode, the control signal transmitter 30 sends a control signal of folding or unfolding, and the control signal receivers 40 marked as even rows send control signals to control the corresponding actuation devices 20 such that the seats 10 of the even rows of the control system for cinema seats are folded or unfolded.

In the step S20, the second control mode and the third control mode are also interchangeable, that is, when the second control mode is for controlling odd rows of seats, the third control mode is for controlling even rows of seats. When the second control mode is for controlling the even rows of seats, the third control mode is used to control the odd rows of seats.

In the step S20, the control mode may be a fourth control mode using the control signal transmitter 30 to send a control signal to each of the control signal receivers 40 to control the seats 10 having a used record in the control system for cinema seats to be folded or unfolded.

In the fourth control mode, the control signal transmitter 30 sends a control signal of folding or unfolding, and the control signal receivers 40, having a used record, send control signals to control the corresponding actuation devices 20 such that the seats 10 having the used record of the control system for cinema seats are folded or unfolded, while the unused seats are not controlled. Thereby the humanization control is improved, the unnecessary mechanical movements is reduced, and the service life of the product is increased.

The above four control modes are selected by sequential cyclic switching, that is, switching from the first control mode to the second control mode to the third control mode to the fourth control mode to the first control mode.

For example, when currently in the second control mode and it needs to be switched to the third control mode, the second control mode can be directly switched to the third control mode via a button or a knob, thereby, controlling the seats 10 of the even or odd rows to be unfolded or folded. Similarly, switching from the first control mode to the second control mode, and the third control mode to the fourth control mode is of the same operation. When currently in the second control mode and it needs to be switched to the fourth control mode, the second control mode can be directly switched to the third control mode through a button or a knob. At this time, the control signal for controlling the unfolding or folding is not sent, but the switching operation is continued until the control mode is switched to the fourth control mode, the control signal for controlling the unfolding or folding is sent, and then the control scheme in the fourth control mode is executed.

Specifically, when currently in the fourth control mode, it is necessary to switch to the first control mode. Herein, the control signal transmitter 30 sends a reset signal to all of the control signal receivers 40, such that all of the seats 10 are in an initial state, and the used records retained within the control signal receivers 40 are deleted, that is, when switching from the fourth control mode to the first control mode, the entire control system is automatically cleared, such that all of the seats 10 return to the initial state, and all of the used records are deleted. The control signal receivers 40 will also start saving new used records. In a specific embodiment, a current detecting circuit can be used to determine whether the seat returns to the initial state.

Step S30 includes adjusting the control signal transmitter 30 from a signal transmission state to a standby state, so as to repeat the operation of the step S20 for the next time. That is, when the seats 10 are in an unfolded state, herein, the control signal transmitter 30 is in the unfolded signal transmission state, and adjusting the control signal transmitter 30 from the unfolded signal transmission state to a standby state. Alternatively, when the seats 10 are in a folded state, herein, the control signal transmitter 30 is in the folded signal transmission state, and adjusting the control signal transmitter 30 from the folded signal transmission state to a standby state.

Step S40 includes turning off the power of the control signal transmitter and/or the control signal receiver to end the operation of the control system for cinema seats.

In the control method of the present embodiment, in order to prevent the film audience in the cinema from arbitrarily playing the control signal transmitter 30, the control signal transmitter 30 is pre-set with a protection mode when the control signal transmitter 30 is in the normal operation mode, and when the conversion frequency of the signal sent by the control signal transmitter 30 is greater than or equal to a predetermined frequency (for example, 2.5 times within 1 second), the control signal transmitter 30 fails within a predetermined period of time (for example, in 5 seconds). The LED indicator on the control signal transmitter 30 will flash, therefore, indicating the worker of the cinema to pay attention to the management protection of the control signal transmitter 30.

The aforementioned embodiments are only preferred embodiments of the present application. For one of ordinary skill in the art, according to the thought of the present application, specific implementation modes and application scopes may be modified, and the content of the specification should not be interpreted as a limitation to the present application.

What is claimed is:

1. A control system for cinema seats, comprising:
   a plurality of seats;
   a plurality of actuation devices configured for driving each of the seats to be folded or unfolded;
   a control signal transmitter; and
   a plurality of control signal receivers configured to be arranged corresponding to one or more of the seats,
   wherein the control signal transmitter is configured to communicatively connect with each of the control signal receivers,
   wherein the control signal receiver is configured to be electrically connected to one or more of the actuation devices,
   wherein each of the control signal receivers is configured to receive a control signal from the control signal transmitter to control one or more of the actuation devices to drive one or more of the seats to be folded or unfolded, and
   wherein each of the control signal receivers is configured to receive the control signal from the control signal transmitter to control the actuation devices to drive the seats of odd or even rows to be folded or unfolded.

2. The control system for cinema seats according to claim 1, wherein each of the control signal receivers is configured to receive the control signal from the control signal transmitter to control the actuation devices to drive all the seats to be folded or unfolded.

3. The control system for cinema seats according to claim 2, wherein the control system further comprises a clutch structure disposed between the actuation devices and the seats, and wherein the clutch structure is configured either to connect the actuation devices with the seats to achieve driving or to disconnect the actuation devices from the seats to achieve manual folding or unfolding of the seats.

4. The control system for cinema seats according to claim 1, wherein each of the control signal receivers is configured to retain used records of the actuation devices, and wherein each of the control signal receivers is configured to receive the control signal from the control signal transmitter to control the actuation devices having the used records to drive corresponding seats to be folded or unfolded.

5. The control system for cinema seats according to claim 4, wherein the control system further comprises a clutch structure disposed between the actuation devices and the seats, and wherein the clutch structure is configured either to connect the actuation devices with the seats to achieve driving or to disconnect the actuation devices from the seats to achieve manual folding or unfolding of the seats.

6. The control system for cinema seats according to claim 1, wherein the control system further comprises a plurality of hand controllers disposed in one-to-one corresponding to each of the seats, and wherein the hand controller is configured to communicatively connect with corresponding actuation devices to control the corresponding seats to be folded or unfolded.

7. The control system for cinema seats according to claim 6, wherein the control system further comprises a clutch structure disposed between the actuation devices and the seats, and wherein the clutch structure is configured either to connect the actuation devices with the seats to achieve driving or to disconnect the actuation devices from the seats to achieve manual folding or unfolding of the seats.

8. The control system for cinema seats according to claim 6, wherein the control signal receiver is provided with a signal receiving module and a control module, wherein the signal receiving module is electrically connected to the control module, wherein the control module is electrically connected to the actuation devices, wherein the signal receiving module is configured to receive a control signal from the control signal transmitter and configured to transmit the control signal to the control module, and wherein the control module is configured to control the actuation devices to drive the seats to be folded or unfolded.

9. The control system for cinema seats according to claim 8, wherein the control system further comprises a clutch structure disposed between the actuation devices and the seats, and wherein the clutch structure is configured either to connect the actuation devices with the seats to achieve driving or to disconnect the actuation devices from the seats to achieve manual folding or unfolding of the seats.

10. The control system for cinema seats according to claim 8, wherein the hand controller is electrically connected to the control module, wherein the control module is configured to distinguish a source of the control signal, and wherein when the control module recognizes that the control signal is from the hand controller, the control signal transmitted by the signal receiving module to the control module is invalid.

11. The control system for cinema seats according to claim 10, wherein the control system further comprises a pressure detecting device mounted in the seat, wherein the pressure detecting device is electrically connected to the control module, and wherein when the pressure detecting device detects that the seat is under pressure, the control signal transmitted by the signal receiving module to the control module is invalid.

12. The control system for cinema seats according to claim 1, wherein the control system further comprises a clutch structure disposed between the actuation devices and the seats, and wherein the clutch structure is configured either to connect the actuation devices with the seats to achieve driving or to disconnect the actuation devices from the seats to achieve manual folding or unfolding of the seats.

13. A method for controlling cinema seats, wherein the method is configured to control a control system for cinema seats that comprises a plurality of seats, a plurality of actuation devices configured for driving each of the seats to be folded or unfolded, a control signal transmitter, and a plurality of control signal receivers configured to be arranged corresponding to one or more of the seats, wherein the control signal transmitter is configured to communicatively connect with each of the control signal receivers, wherein the control signal receiver is configured to be electrically connected to one or more of the actuation devices, wherein each of the control signal receivers is configured to receive a control signal from the control signal transmitter to control one or more of the actuation devices to drive one or more of the seats to be folded or unfolded, and wherein the method comprises:
    pairing the control signal transmitter with the control signal receivers in the control system for cinema seats;
    selecting a corresponding control mode and using the control signal transmitter to send a control signal to each of the control signal receivers to control one or more seats of the control system for cinema seats to be folded or unfolded after the pairing is completed;
    adjusting the control signal transmitter from a signal transmission state to a standby state, ready to repeat the operation of selecting the corresponding control mode and using the control signal transmitter to send the control signal to each of the control signal receivers next time; and
    turning off the power of the control signal transmitter, the control signal receiver, or both to end the operation of the control system for cinema seats.

14. The method according to claim 13, wherein when selecting the corresponding control mode and using the control signal transmitter to send the control signal to each of the control signal receivers, the control mode is to transmit a control signal to each of the control signal receivers by using the control signal transmitter to control the seats of the even rows of the control system for cinema seats to be folded or unfolded.

15. The method according to claim 13, wherein when selecting the corresponding control mode and using the control signal transmitter to send the control signal to each of the control signal receivers, the control mode is to transmit a control signal to each of the control signal receivers by using the control signal transmitter to control the seats having a used record of the control system for cinema seats to be folded or unfolded.

16. The method according to claim 13, wherein the control signal transmitter is pre-set with a protection mode, and wherein when a conversion frequency of the signal received from the control signal transmitter is greater than or equal to a predetermined frequency, the control signal transmitter fails for a predetermined length of time.

17. The method according to claim 13, wherein when selecting the corresponding control mode and using the control signal transmitter to send the control signal to each of the control signal receivers, the control mode is to transmit a control signal to each of the control signal receivers using the control signal transmitter to control all the seats of the control system for cinema seats to be folded or unfolded.

18. The method according to claim 13, wherein when selecting the corresponding control mode and using the control signal transmitter to send the control signal to each of the control signal receivers, the control mode is to transmit a control signal to each of the control signal receivers by using the control signal transmitter to control the seats of the odd rows of the control system for cinema seats to be folded or unfolded.

19. A control system for cinema seats, comprising:
a plurality of seats;
a plurality of actuation devices, configured for driving each of the seats to be folded or unfolded;
a control signal transmitter; and
a plurality of control signal receivers configured to be arranged corresponding to one or more of the seats,
wherein the control signal transmitter is configured to communicatively connect with each of the control signal receivers,
wherein the control signal receiver is configured to be electrically connected to one or more of the actuation devices,
wherein each of the control signal receivers is configured to receive a control signal from the control signal transmitter to control one or more of the actuation devices to drive one or more of the seats to be folded or unfolded,
wherein each of the control signal receivers is configured to retain used records of the actuation device, and
wherein each of the control signal receivers receives the control signal from the control signal transmitter to control the actuation devices having the used records to drive corresponding seats to be folded or unfolded.

* * * * *